June 17, 1952  SAMUEL VICTOR  2,600,944
NOW BY JUDICIAL CHANGE OF NAME
SAM WOMEN SAM
CHAIR SEAT
Filed July 22, 1948  2 SHEETS—SHEET 1
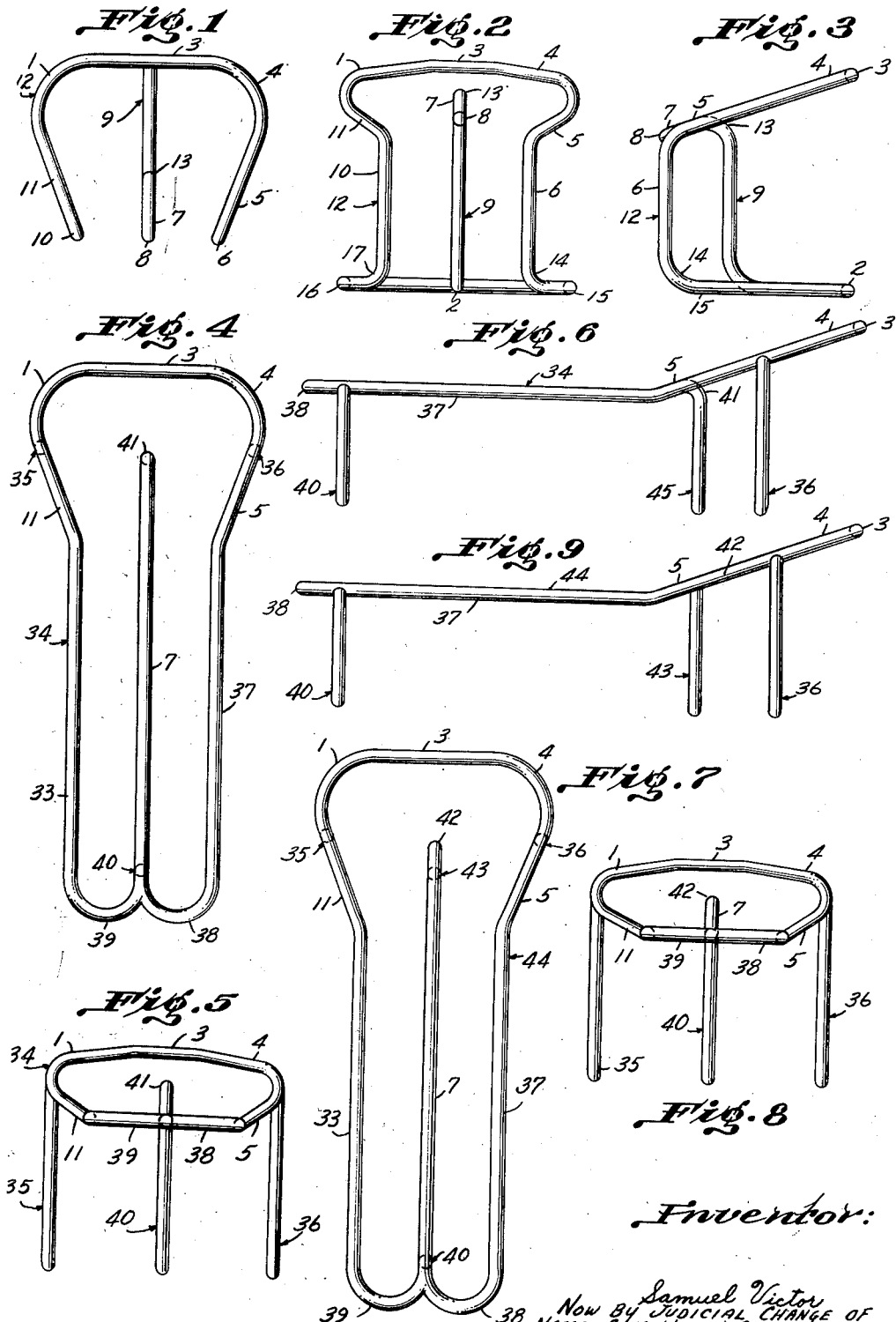
Inventor:
Samuel Victor
Now by Judicial Change of
Name, Sam Women Sam.

June 17, 1952  SAMUEL VICTOR  2,600,944
NOW BY JUDICIAL CHANGE OF NAME
SAM WOMEN SAM
CHAIR SEAT
Filed July 22, 1948  2 SHEETS—SHEET 2
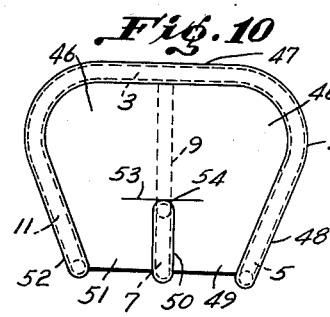
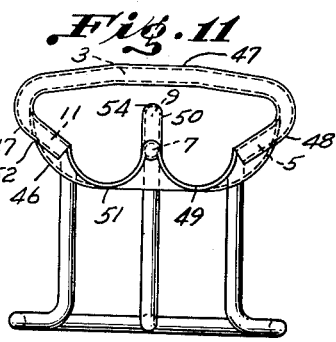
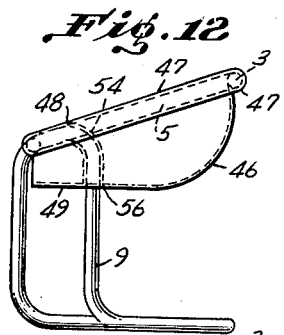
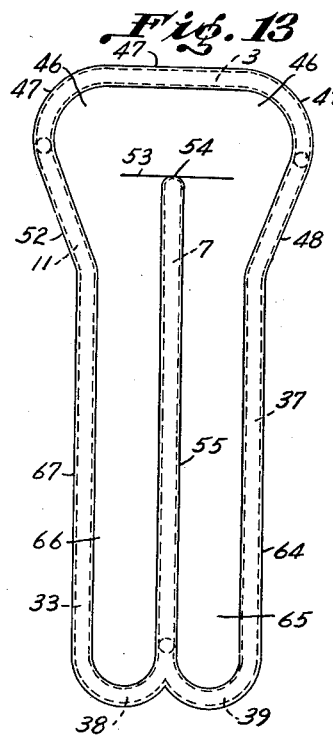
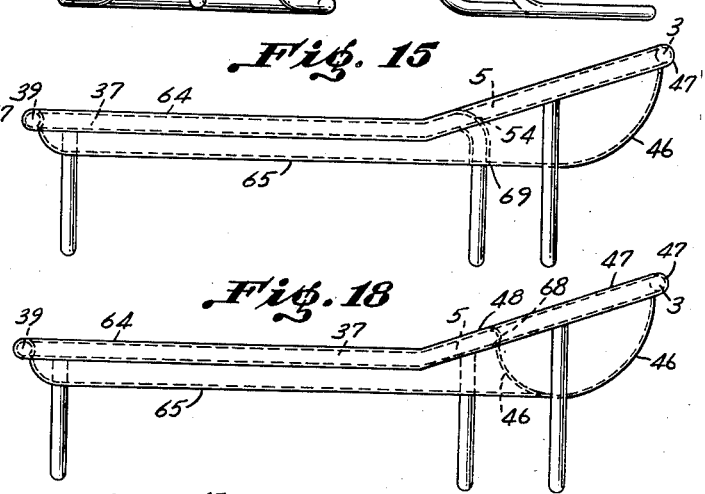
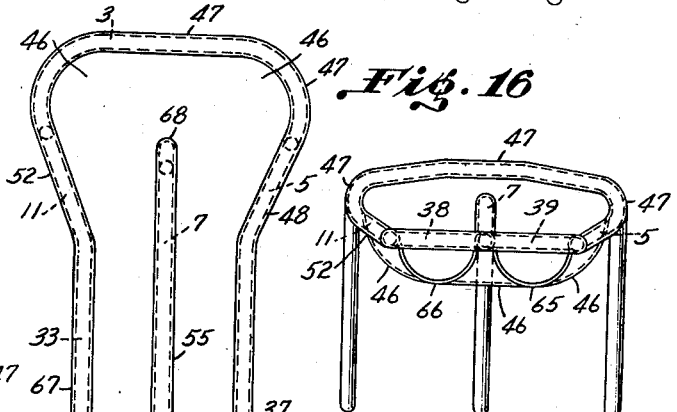
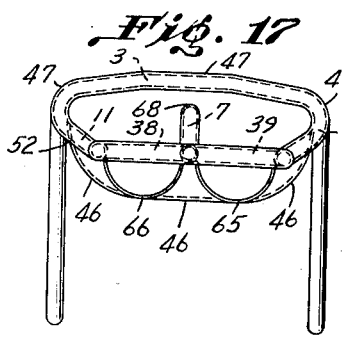
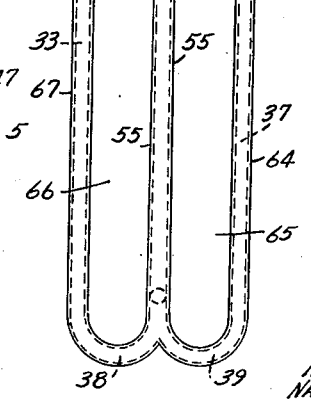
Inventor:
Samuel Victor
Now by Judicial Change of
Name, Sam Women Sam.

Patented June 17, 1952

2,600,944

UNITED STATES PATENT OFFICE 2,600,944

CHAIR SEAT

Samuel Victor, Chicago, Ill., now by judicial change of name Sam Women Sam

Application July 22, 1948, Serial No. 42,961

8 Claims. (Cl. 155—112)

My invention relates to chair seats. This application is a continuation-in-part of my abandoned application of the same title, Serial Number 10,824 filed February 25, 1948.

An object is to devise a chair seat which is self conforming to the seat of the body without the aid of springs and padding.

Other objects and advantages become apparent as the description proceeds.

I attain this object by devices illustrated in the accompanying drawing, in which:

Figure 1 is a top view of a seat frame;

Figure 2 is a front view of the same seat frame;

Figure 3 is a side view of the same seat frame;

Figure 4 is a top view of a long seat frame;

Figure 5 is a front view of the same long seat frame;

Figure 6 is a side view of the same long seat frame;

Figure 7 is a top view of an alternative form of a long seat frame;

Figure 8 is a front view of the alternative form of a long seat frame;

Figure 9 is a side view of the alternative form of a long seat frame;

Figure 10 is a top view of a seat;

Figure 11 is a front view of the same seat;

Figure 12 is a side view of the same seat;

Figure 13 is a top view of a long seat;

Figure 14 is a front view of the same long seat;

Figure 15 is a side view of the same long seat;

Figure 16 is a top view of an alternative form of a long seat;

Figure 17 is a front view of the alternative form of a long seat; and

Figure 18 is a side view of the alternative form of a long seat.

In the chair seat frame 12 indicated in Figures 1 to 3 are a pair of outer, lateral, forwardly converging, thigh supporting seat frame members 5 and 11 joined by the semi-annular buttocks supporting seat frame member 3 at the rear and supported at the forward ends by vertical supports 6 and 10. In the seat frame 12 is also a common lateral inner thigh supporting seat frame member 7 having a forward end 8 and a rear bent end 13 and being supported at the rear end 13 by vertical support 9 which latter is bent rearwardly and horizontally and is joined to rear floor support 2. Rear floor support 2 is joined to lateral floor supports 15 and 16 which, in turn, are joined to vertical supports 6 and 10 at their bent bottom ends 14 and 17. Semi-annular seat frame member 3 has side segments 1 and 4. The width of the common inner seat frame member 7 should preferably be as narrow as practicable.

In the long chair seat frame 34 indicated in Figures 4 to 6 is a pair of outer, lateral, forwardly converging, thigh supporting seat frame members 5 and 11 joined by the semi-annular buttocks supporting seat frame member 3 at the rear. In the seat frame 34 are also a common lateral inner thighs and legs supporting seat frame member 7 and a pair of outer, lateral leg supporting frame members 37 and 33 which are joined at the rear with seat frame members 5 and 11 and whose front inwardly bent ends 38 and 39 join common inner thighs and legs seat frame member 7. The seat frame 34 is supported by, and joined to vertical supports 35, 36, 40 and 45.

In the long chair seat frame 44 indicated in Figures 7 to 9, are a pair of outer, lateral, forwardly converging, thigh supporting seat frame members 5 and 11 joined by the semi-annular buttocks supporting seat frame member 3 at the rear. In the seat frame 44 are also a common lateral inner thighs and legs supporting seat frame member 7 and a pair of outer, lateral leg supporting frame members 37 and 33 which are joined at the rear with seat members 5 and 11 and whose front inwardly bent ends 38 and 39 join common inner thighs and legs frame member 7. The seat frame 44 is supported by, and joined to, vertical supports 35, 36, 40 and 43.

In the chair seat indicated in Figures 10 to 12 is a supple, stretchable, elastic, downwardly concave, thighs and buttocks supporting sheet coextensive with, spanning across, and suspended from, common inner seat frame member 7, both outer lateral seat frame members 5 and 11 and semi-annular seat frame member 3. The sheet is composed of thigh segments 49 and 51 and a buttocks segment 46 and has a tubular edge 48 which engages and is bonded to frame member 5, a tubular edge 52 which engages and is bonded to frame member 11, a tubular edge 47 which engages and is bonded to semi-annular frame 3, a common inner tubular edge 50 which engages and is bonded to common inner frame member 9 and also has a rear end 54 to 56 at which vertically disposed, transverse, central wall 53 is located. The width of the common inner seat frame member 7 together with its common tubular edge 50 of sheet segments 49 and 51 should preferably be as little as practicable.

In the long chair seat indicated in Figures 13 to 15 is a supple, stretchable, elastic, downwardly concave, thighs, legs and buttocks supporting sheet coextensive with, spanning across, and suspended from, common inner seat frame member 7, both outer, lateral seat frame members 5, 11, 37 and 33 with their front bent ends 38 and 39 and semi-annular frame member 3. The sheet is composed of thigh and leg segments 65 and 66 and a buttocks segment 46 and has a tubular edge 48 which engages and is bonded to frame member 5, a tubular edge 52 which engages and is bonded to frame member 11, a tubular edge 47 which engages and is bonded to semi-annular frame member 3, a common inner tubular edge 55 which engages and is bonded to frame member 7, a tubular edge 64 which engages and is bonded to frame member 37, a tubular edge 67 which engages and is bonded to frame member 33 and also has a rear end 54 to 69 at which vertically disposed, transverse, central wall 53 is located. Buttocks segment 46 of the sheet is suspended from the common inner frame member 7 at its rear end 41 at a point 69 low enough and forward enough in relation to the fork of the thighs of a seated man to provide ample clearance for the accommodation of his privates. Additional clearance may be provided by locating the point of suspension of the sheet forwardly of the rear edge 53 of the sheet segments 65 and 66.

In the long chair seat indicated in Figures 16 to 18 is a supple, stretchable, elastic, downwardly concave, thighs, legs and buttocks supporting sheet coextensive with, spanning across, and suspended from, common inner seat members 7, both outer lateral seat frame members 5, 11, 37 and 33 with their front bent ends 38 and 39 and semi-annular frame member 3. The sheet is composed of thigh and leg segments 65 and 66 and a buttocks segment 46 and has a tubular edge 48 which engages and is bonded to frame member 5, a tubular edge 52 which engages and is bonded to frame member 11, a tubular edge 47 which engages and is bonded to semi-annular frame member 3, a common tubular edge 55 which engages and is bonded to frame member 7, a tubular edge 64 which engages and is bonded to frame member 37, a tubular edge 67 which engages and is bonded to frame member 33 and also has a rear tubular end 68 covering rear end 42 of the common inner frame member 7 at which rear end 42 buttocks supporting segment 46 of the sheet is suspended.

I claim:

1. A chair seat comprising a pair of laterally spaced thigh supporting members and an inner thigh supporting member interposed therebetween, said pair of thigh supporting members and said inner thigh supporting member being elongated longitudinally disposed and rigidly interconnected, said pair of thigh supporting members extending rearwardly with respect to the rear end of said inner thigh supporting member a distance required to support the buttocks laterally conformably in a sitting position, a rear buttocks supporting member interposed laterally between and rigidly interconnected with said pair of thigh supporting members and located at a suitable distance rearwardly with respect to said rear end of said inner thigh supporting member to support the rear of the buttocks longitudinally conformably in a sitting position, and a supple concave sheet member spanning across and suspended from each of said pair of thigh supporting members and said inner thigh supporting member and also spanning across and suspended from said rear buttocks supporting member and the rearwardly extending segments of said pair of thigh supporting members, the segment of said sheet member which spans across and is suspended from each of said pair of thigh supporting members and said inner thigh supporting member being adapted to support and conform to the thighs laterally in a sitting position, and the segment of said sheet member which spans across and is suspended from said rear buttocks supporting member and said rearwardly extending segments of said pair of thigh supporting members being adapted to support and conform to the buttocks laterally and also to support and conform to the rear of the buttocks longitudinally in a sitting position.

2. A chair seat as set forth in claim 1 in which said sheet member is stretchable and elastic.

3. A chair seat comprising a pair of laterally spaced thigh supporting members and an inner thigh supporting member interposed therebetween, said pair of thigh supporting members and said inner thigh supporting member being elongated longitudinally disposed and rigidly interconnected, said pair of thigh supporting members extending rearwardly with respect to the rear end of said inner thigh supporting member a distance required to support the buttocks laterally conformably in a sitting position and thence extending inwardly toward and joining with each other, the inwardly extending segments of said pair of thigh supporting members being adapted to support the rear of the buttocks longitudinally conformably in a sitting position, and a supple concave sheet member spanning across and suspended from each of said pair of thigh supporting members and said inner thigh supporting member and also spanning across and suspended from said inwardly extending segments of said pair of thigh supporting members and the rearwardly extending segments of said pair of thigh supporting members, the segment of said sheet member which spans across and is suspended from said pair of thigh supporting members and said inner thigh supporting member being adapted to support and conform to the thighs laterally in a sitting position, and the segment of said sheet member which spans across and is suspended from said inwardly extending segments of said pair of thigh supporting members and said rearwardly extending segments of said pair of thigh supporting members being adapted to support and conform to the buttocks laterally and also to support and conform to the rear of the buttocks longitudinally in a sitting position.

4. A chair seat as set forth in claim 3 in which said sheet member is stretchable and elastic.

5. A long chair seat comprising a pair of laterally spaced leg and thigh supporting members and an inner leg and thigh supporting member interposed therebetween, said pair of leg and thigh supporting members and said inner leg and thigh supporting member being elongated longitudinally disposed and rigidly interconnected, said pair of leg and thigh supporting members extending rearwardly with respect to the rear end of said inner leg and thigh supporting members a distance required to support the buttocks laterally conformably in a sitting position and thence extending inwardly toward and joining with each other, the inwardly extending segments of said pair of leg and thigh supporting members being adapted to support the rear of the buttocks longitudinally conformably in a sitting position, and a supple concave sheet member spanning across and suspended from each of said pair of leg and thigh supporting members and said inner leg and thigh supporting member and also spanning across and suspended from said inwardly extending segments of said pair of leg and thigh supporting members and the rearwardly extending segments of said pair of leg and thigh supporting members, the segment of said sheet member which spans across and is suspended from each of said pair of leg and thigh supporting members and said inner leg and thigh supporting member being adapted to support and conform to the legs and thighs laterally in a sitting position, and the segment of said sheet member which spans across and is suspended from said inwardly extending segments of said pair of leg and thigh supporting members and said rearwardly extending segments of said pair of leg and thigh supporting members being adapted to support and conform to the buttocks laterally and also to support and conform to the rear of the buttocks longitudinally in a sitting position.

6. A long chair seat as set forth in claim 5 in which said sheet member is stretchable and elastic.

7. A long chair seat comprising a pair of laterally spaced leg and thigh supporting members and an inner leg and thigh supporting member interposed therebetween, said pair of leg and thigh supporting members and said inner leg and thigh supporting member being elongated longitudinally disposed and rigidly interconnected, said pair of leg and thigh supporting members extending rearwardly with respect to the rear end of said inner leg and thigh supporting member a distance required to support the buttocks laterally conformably in a sitting position, a rear buttocks supporting member interposed laterally between and rigidly interconnected with said pair of leg and thigh supporting members and located at a suitable distance rearwardly with respect to said rear end of said inner leg and thigh supporting member to support the rear of the buttocks longitudinally conformably in a sitting position, and a supple concave sheet member spanning across and suspended from each of said pair of leg and thigh supporting members and said inner leg and thigh supporting member and also spanning across and suspended from said rear buttocks supporting member and the rearwardly extending segments of said pair of leg and thigh supporting members, the segment of said sheet member which spans across and is suspended from each of said pair of leg and thigh supporting members and said inner leg and thigh supporting member being adapted to support and conform to the legs and thighs laterally in a sitting position, and the segment of said sheet member which spans across and is suspended from said rear buttocks supporting member and said rearwardly extending segments of said pair of leg and thigh supporting members being adapted to support and conform to the buttocks laterally and also to support and conform to the rear of the buttocks longitudinally in a sitting position.

8. A long chair seat as set forth in claim 7 in which said sheet member is stretchable and elastic.

SAMUEL VICTOR.

REFERENCES CITED

The following references are of record in the file of this patent:

UNITED STATES PATENTS

| Number | Name | Date |
|---|---|---|
| 644,506 | Dromgold | Feb. 27, 1900 |
| 733,405 | Lein | July 14, 1903 |
| 820,026 | Stokes | May 8, 1906 |
| 1,455,234 | Thompson | May 15, 1923 |
| 1,549,647 | Worthington | Aug. 11, 1925 |
| 1,557,647 | Austin | Oct. 20, 1925 |
| 1,846,936 | Bayer | Feb. 23, 1932 |
| 1,931,504 | Merrill | Oct. 24, 1933 |
| 2,125,985 | Bond | Aug. 9, 1938 |
| 2,318,059 | Cooper | May 4, 1943 |
| 2,318,416 | Pierce | May 4, 1943 |
| 2,480,406 | Forney | Aug. 30, 1949 |
| 2,482,996 | Wisby | Sept. 27, 1949 |